United States Patent [19]
Winnik et al.

[11] Patent Number: 5,271,764
[45] Date of Patent: Dec. 21, 1993

[54] INK COMPOSITIONS

[75] Inventors: Françoise M. Winnik; Mitchell A. Winnik, both of Toronto; Anthony R. Davidson, Agincourt, all of Canada

[73] Assignee: Xerox Corporation, Stamford, Conn.

[21] Appl. No.: 834,093

[22] Filed: Feb. 12, 1992

[51] Int. Cl.$^5$ ............................................. C09D 11/02
[52] U.S. Cl. ................................. 106/21 A; 106/21 R; 106/20 D
[58] Field of Search .................... 106/21 A-21 R, 106/20 D; 8/648

[56] References Cited

U.S. PATENT DOCUMENTS

| | | | |
|---|---|---|---|
| 4,255,273 | 3/1981 | Sakkab | 252/102 |
| 4,400,173 | 8/1983 | Beavan | 8/107 |
| 4,417,994 | 11/1983 | Stoddart | 252/135 |
| 4,601,777 | 7/1986 | Hawkins et al. | 156/626 |
| 4,623,689 | 11/1986 | Shintani et al. | 524/457 |

FOREIGN PATENT DOCUMENTS 2-238061  9/1990  Japan.

Primary Examiner—Helene Klemanski
Assistant Examiner—Margaret Einsmann
Attorney, Agent, or Firm—E. O. Palazzo

[57] ABSTRACT

An ink composition comprised of a solution comprised of a dye comprised of a porphyrin chromophore.

1 Claim, No Drawings

INK COMPOSITIONS

BACKGROUND OF THE INVENTION

The present invention is directed to ink compositions and imaging and printing processes thereof. More specifically, in one embodiment the present invention is directed to fluorescent ink jet ink compositions useful in the printing of concealed images for security or encoding applications, and wherein the inks contain dyes based on the porphyrin chromophore, or analogous components. These dyes usually possess an extremely strong absorption band at 400 to 500 nanometers, the Soret Band, in addition to much weaker bands in the 500 to 800 nanometers range. These dyes also exhibit fluorescence in the 600 to 800 nanometers spectral range, an area which is distinct from the emission window characteristic of the optical brightners used in commercial papers. In one embodiment the inks of the present invention are comprised of a porphyrin chromophore dye like tetrapyridinium porphyrin tetra-acetate and an aqueous liquid vehicle. The inks can be formulated after mixing the aqueous component and the dye by the addition, for example, of a cosolvent comprised of water and a glycol, like diethyleneglycol, thereby improving latency, which is the maximum time period, for example less than one hour, and from about 1 to about 10 minutes, over which an uncapped ink jet printhead can remain idle before noticeable deterioration of its jetting performances, and this addition can improve ink drying time, that is the time needed for an ink jet print to dry to an extent such that it will not smear or offset upon handling or when placed in contact with another sheet of paper, which drying time can, for example, be less than one minute, or more specifically from about 10 to about 30 seconds. Also, the addition of glycol permits the adjustments of the ink viscosity from about 1.1 to about 4 centipoises, and preferably from about 1.1 to about 3.0 centipoises, and can permit adjustment of the ink surface tension. Viscosity and surface tensions are major contributing factors in the production of excellent quality prints on plain papers, that is prints with acceptable edge acuity, that is the sharpness of the image between the printed and nonprinted areas, minimal ink feathering on paper, and characterized, for example, by a desirable uniformity of solid area ink coverage. The inks of the present invention can be selected for a number of known ink jet printing methods and apparatus, including thermal ink jet or bubble jet processes as described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of which are totally incorporated herein by reference.

Ink jet printing systems can generally be classified by two types: continuous stream and drop-on-demand. In continuous stream ink jet systems, ink is emitted in a continuous stream under pressure through at least one orifice or nozzle. The stream is perturbed causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet or bubble jet. With this type, there are apparently generated high velocity droplets and there is allowed very close spacing of the nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction toward a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known as indicated herein, and are described, for example, in U.S. Pat. Nos. 4,601,777; 4,251,824; 4,410,899; 4,412,224; and 4,532,530, the disclosures of each of which are totally incorporated herein by reference.

Known ink jet inks generally comprise a water soluble dye which is soluble in an ink vehicle such as water or a mixture comprising water and a water soluble or water miscible organic solvent. Inks comprising soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of the dyes contained in inks may be potentially toxic or mutagenic. Also, with the inks of the present invention there are selected dyes that enable the verification of documents printed on fluorescent paper with such inks, primarily because of the emission spectra of the dyes as indicated herein.

The following United States patents are also mentioned: U.S. Pat. No. 4,705,567 relating, for example, to heterophase ink compositions comprised of water and a dye covalently attached to a polyethylene glycol, or polyethylene imine component, which component is complexed with a heteropolyanion; U.S. Pat. No. 4,623,689 which discloses, for example, an ink for ink jet recording wherein the ink contains a certain aqueous colored polymer, see the Abstract for example; and as collateral interest U.S. Pat. Nos. 4,664,708; 4,680,332 and 4,791,165. The disclosures of the aforementioned patents, and all other patents mentioned herein are totally incorporated herein by reference.

Copending application U.S. Ser. No. 544,564 (now abandoned), the disclosure of which is totally incorporated herein by reference, relates, for example, to ink compositions which comprise an aqueous liquid vehicle and colored particles of an average diameter of 100 nanometers or less which comprise micelles of block copolymers of the formula ABA, wherein A represents a hydrophilic segment and B represents a hydrophobic segment, and wherein dye molecules are covalently attached to the micelles. In a specific embodiment of the copending application, the colored particles comprise micelles of block copolymers of the formula ABA having silica precipitated therein and dye molecules covalently attached to the micelles.

U.S. Pat. No. 5,225,900, entitled "Method of Storing Information Within a Reprographic System", with the named inventor Joseph D. Wright, the disclosure of which is totally incorporated herein by reference, discloses apparatuses and processes for controlling a reproduction system by scanning an image to detect at least one taggant in at least one marking material forming the image and issuing instructions to the reproduction system; the instructions cause the reproduction system to take an action selected from the group consisting of (a) prohibiting reproduction of those portions of the image formed by a marking material containing at least one predetermined detected taggant and reproducing all other portions of the image; (b) prohibiting reproduction of any part of the image upon detection of at least one predetermined taggant; (c) reproducing only those portions of the image formed by a marking material containing at least one predetermined taggant; (d) reproducing portions of the image formed by a marking material containing at least one predetermined taggant in a different manner from that in which the system reproduces portions of the image formed by a marking material not containing at least one predetermined taggant; and (e) identifying a source of the image on the basis of detection of at least one predetermined taggant.

Although known ink compositions are suitable for their intended purposes, a need remains for ink compositions that are invisible to the human eye under normal viewing conditions but readable by a sensor, such as an infrared detector or a fluorescence detector, or by the human eye under special viewing conditions such as illumination of the developed image with ultraviolet light. Further, there is a need for ink compositions that can provide a means for placing coded information on a document. Further, there is a need for ink compositions that are nontoxic and nonmutagenic. There is also a need for ink compositions that can be prepared by simple and economical processes. Further, there is a need for ink compositions suitable for printing on plain papers, coated or treated papers, and transparency materials. In addition, there is a need for ink compositions that when printed on substrates exhibit low feathering, and excellent rub-resistance. A need also remains for ink compositions with acceptable thermal and oxidative stability.

SUMMARY OF THE INVENTION

It is an object of the present invention to provide ink compositions with many of the advantages illustrated herein.

It is another object of the present invention to provide ink jet compositions with certain dyes.

It is another object of the present invention to provide ink compositions that can be selected for the formulation of images that are invisible to the human eye under normal viewing conditions but readable by a sensor, such as fluorescence detector, or by the human eye under special viewing conditions such as illumination of the image with ultraviolet light.

It is still another object of the present invention to provide ink compositions with a fluorescent dye which emits light in a region of the visible spectrum where there is no interference from the intrinsic paper fluorescence.

It is still another object of the present invention to provide ink compositions that can provide a means for placing coded information on a document.

Still another object of the present invention is to provide ink compositions with dyes of a porphyrin that posses specific photophysical characteristics enabling the unauthorized detection of concealed images to be very difficult.

It is yet another object of the present invention to provide ink compositions that can be selected for the generation of images which have an optical density no greater than 0.05.

It is yet another object of the present invention to provide ink compositions with porphyrin chromophores that exhibit extremely strong absorption bands with maxima in the 380 to 500 nanometer range, and much weaker bands in the 500 to 800 nanometer range, and wherein excitation of the 400 to 500 band results in a strong fluorescence in the 600 to 800 nanometer range.

Yet another object of the present invention is to provide ink compositions that can be prepared by simple and economical processes.

It is another object of the present invention to provide ink compositions suitable for printing on plain papers, coated or treated papers, and transparency materials.

Another object of the present invention is to provide ink compositions with acceptable thermal and storage stability.

Moreover, another object of the present invention is to provide ink compositions suitable for ink jet printing, which inks do not induce, or minimize clogging of the ink printheads.

These and other objects of the present invention can be accomplished in embodiments thereof by providing an ink composition which comprises an aqueous liquid vehicle and certain dyes. In one embodiment, the inks of the present invention are comprised of a solution comprised of a porphyrin type dye.

The dyes suitable for the ink compositions of the present invention include any of the known water soluble dyes comprised of a porphyrin chromophore, such as for example 5,10,15,20-tetrakis-(1-methyl-4-pyridyl)21H,23H-porphine, tetra-p-tosylate salt, available from Aldrich Chemical Corporation, 5,10,15,20-tetrakis-(1-methyl-4-pyridyl)-21H,23H-porphine, tetra-chloride salt, 5,10,15,20-tetrakis-(1-methyl-4-pyridyl)-21H,23H-porphine, tetra-bromide salt, 5,10,15,20-tetrakis-(1-methyl-4-pyridyl)-21H,23H-porphine, tetra-acetate salt, 5,10,15,20-tetrakis-(1-methyl-4-pyridyl)-21H,23H-porphine, tetra-perchlorate salt, 5,10,15,20-tetrakis-(1-methyl-4-pyridyl)-21H,23H-porphine, tetra-fluoroborate salt, 5,10,15,20-tetrakis-(1-methyl-4-pyridyl)-21H,23H-porphine, tetra-perchlorate salt, 5,10,15,20-tetrakis-(1-methyl-4-pyridyl)-21H,23H-porphine, tetra-triflate salt, 5,10,15,20-tetrakis-(1-hydroxymethyl-4-pyridyl)-21H,23H-porphine, tetra-p-tosylate salt, 5,10,15,20-tetrakis-[1-(2-hydroxyethyl)-4-pyridyl]-21H,23H-porphine, tetra-chloride salt, prepared as described, for example, by V. N. Madakyan, *Chemistry of Heterocyclic Compounds*, 1986, pages 167 to 171, 5,10,15,20-tetrakis-[1-(3-hydroxypropyl)-4-pyridyl]-21H,23H-porphine, tetra-p-tosylate salt, 5,10,15,20-tetrakis-[1(2-hydroxypropyl)-4-pyridyl]-21H,23H-porphine, tetra-p-tosylate salt, 5,10,15,20-tetrakis-[1-(2-hydroxyethoxyethyl)-4-pyridyl]-21H,23H-porphine, tetra-p-tosylate salt, 5,10,15,20-tetrakis-[1-(2-hydroxyethoxypropyl)-4-pyridyl]-21H,23H-porphine, tetra-p-tosylate salt, 5,10,15,20-tetrakis-[4-(trimethylammonio)-phenyl]-21H,23H-porphine, tetra-p-tosylate salt, available from Aldrich Chemical Corporation, 5,10,15,20-tetrakis-[4-(trimethylammonio)phenyl]-21H,23H-porphine, tetra-chloride salt, 5,10,15,20-tetrakis-[4-(trimethylammonio)phenyl]-21H,23H-porphine, tetra-bromide salt, 5,10,15,20-tetrakis-[4-(trimethylammonio)phenyl]-21H,23H-porphine, tetra-acetate salt, 5,10,15,20-tetrakis-[4-(trimethylammonio)phenyl]-21H,23H-porphine, tetra-perchlorate salt, 5,10,15,20-tetrakis-[4-(trimethylammonio)phenyl]-21H,23H-porphine, tetra-fluoroborate salt, 5,10,15,20-tetrakis-[4-(trimethylammonio)phenyl]-21H,23H-porphine, tetra-triflate salt, meso-(N-methyl-X-pyridinium)$_n$-(phenyl)4-n-21H,23H-porphine, tetra-p-tosylate salt, where n is an integer of value 0, 1, 2, or 3, and where X=4-(para), 3-(meta), or 2-(ortho) refers to the position of the nitrogen in the pyridinium substituent, prepared as described, for example, by M. A. Sari et al. in *Biochemistry*, 1990, 29, 4205 to 4215; meso-tetrakis-[o-(N-methylnicotinamido)phenyl]-21H,23H-porphine, tetra-methyl sulfonate salt, prepared as described, for example, by G. M. Miskelly et al. in *Inorganic Chemistry*, 1988, 27, 3773 to 3781; 5,10,15,20-tetrakis-(2-sulfonatoethyl-4-pyridyl)-21H,23H-porphine, chloride salt, prepared as described by S. Igarashi and T. Yotsuyanagi in *Chemistry Letters*, 1984, 1871; 5,10,15,20-tetrakis-(carboxymethyl-4-pyridyl)-21H,23H-porphine, chloride salt, 5,10,15,20-tetrakis-(carboxyethyl-4-pyridyl)-21H,23H-porphine, chloride salt, 5,10,15,20-tetrakis-(carboxyethyl-4-pyridyl)-21H,23H-porphine, bromide salt, 5,10,15,20-tetrakis-(carboxylate-4-pyridyl)-21H,23H-porphine, bromide salt, prepared as described by D. P. Arnold in *Australian Journal of Chemistry*, 1989, 42, 2265 to 2274; 2,3,7,8,12,13,17,18-octa-(2-hydroxyethyl)-21H-23H-porphine, 2,3,7,8,12,13,17,18-octa-(2-hydroxyethoxyethyl)-21H-23H-porphine, 2,3,7,8,12,13,17,18-octa-(2-aminoethyl)-21H-23H-porphine, 2,3,7,8,12,13,17,18-octa-(2-hydroxyethoxypropyl)-21H-23H-porphine, mixtures thereof, and the like. These dyes are available from various sources, and also many of them can be prepared by known means, such as by following the general synthesis described in *Organic Synthesis*, A. I. Meyers, Editor, Volume 70, 68 to 72 (1991) and the references included therein, the disclosures of which are totally incorporated herein by reference.

Within the ink composition, the dye is present in any effective amount to achieve the desired degree of detection of a printed image invisible to the human under normal viewing conditions. Typically, the dye is present in an amount of from 0.0005 percent by weight to about 0.01 percent by weight, and preferably from about 0.001 to about 0.008 percent by weight. Generally, the dye is present in the ink in various effective amounts such as from between about 0.5 to about 10 percent by weight and preferably from between about 2 to about 6 percent by weight.

The liquid vehicle of the inks of the present invention can be comprised of various known components, such as water, a mixture of water and a miscible organic component, such as a glycol, like ethylene glycols, propylene glycols, diethylene glycols, glycerines, dipropylene glycols, polyethylene glycols, polypropylene glycols, amides, ethers, carboxylic acids, esters, alcohols, organosulfides, organosulfoxides, sulfones, dimethylsulfoxides, sulfolanes, alcohol derivatives, carbitols, butyl carbitols, cellusolves, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant which has a boiling point higher than that of water (100° C.). The ink liquid vehicle components, that is for example the water and the humectants, generally possess absorption characteristics on paper and evaporation properties allowing for the desired ink jet printing speed when the ink is to be used in an ink jet printing process. With the inks of the present invention in embodiments, the liquid vehicle can be present in an amount of from about 85 to about 99.5 percent by weight, and preferably from about 90 to about 99 percent by weight.

Optional known additives can be present in the inks of the present invention as indicated herein, such as biocides like DOWICIL ™ 150, 200, and 75, benzoate salts, sorbate salts, and the like, present in an effective amount of, for example, from about 0.0001 to about 4 percent by weight, and preferably from about 0.01 to about 2.0 percent by weight; humectants such as ethylene glycol, diethylene glycol, N-methylpyrrolidinone, propylene glycol, hydroxyethers, ethers, amides, sulfoxides, ketones, lactones, esters, alcohols, and the like, present in an effective amount of, for example, from 0 to about 50 percent by weight, and preferably from about 5 to about 40 percent by weight, pH controlling agents such as acids or bases, phosphate salts, carboxylates salts, sulfite salts, amine salts, and the like, present in an amount of from 0 to about 1 percent by weight, and preferably from about 0.01 to about 1 percent by weight, or the like.

The ink compositions of the present invention can be prepared by various suitable processes. Typically, the inks are prepared by simple mixing of the ingredients. One process embodiment entails mixing all of the ink ingredients together and filtering the mixture to obtain an ink. Optionally, the mixture obtained after mixing all the ingredients can be heated to a temperature of from about 40° C. to about 55° C. for a period of from about 2 to about 3 hours, subsequently cooling the mixture to room temperature (typically from about 10° to about 35° C.) and filtering the mixture to obtain an ink. More specifically, the inks of the present invention can be prepared by (1) adding a solution in water of the dye to a magnetically stirred solution in water of a humectant and a biocide resulting in a solution containing a dye in an amount of from about 0.0005 to about 0.01 percent by weight and preferably from about 0.001 to about 0.008 percent by weight, a humectant in an amount of from about 0 to about 70 percent by weight, and preferably from about 3 to about 50 percent by weight, a biocide in an amount of from about 0.0001 to about 4 percent by weight and preferably from about 0.01 to about 2 percent by weight, and water from about 29.5 to 99.5 percent by weight and preferably from about 49.5 to about 96.5 percent by weight, this solution being kept at a temperature ranging from 10° to 30° C., and preferably from 20° to 25° C.; (2) stirring the resulting mixture at a temperature ranging from 20° to 25° C. for a period of 2 to 24 hours, and preferably 10 to 15 hours; optionally the mixture can be heated to a temperature ranging from 30° to 60° C. for a period of time ranging from 30 minutes to 2 hours; (3) filtering the resulting mixture through a 0.45 micron filter; and (4) adjusting the ink pH, measured with an Omega pH-meter, to a value ranging from 6.5 to 10.5 by dropwise addition of an aqueous solution of an acid, such as for example hydrochloric acid.

Ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ ™ printer, HEWLETT PACKARD DESK JET ™ printers, the DIABLO C150 TIJ ™ printer, or the like. Particularly preferred is a thermal ink jet printing apparatus. The inks of the present invention can be used to form images on a wide variety of substrates, including plain paper such as Xerox 4024 ® paper, bond paper such as Gilbert ® 25 percent cotton bond paper or Gilbert ® 100 percent cotton bond paper, Sanyo Kokusaku FX-L paper available from Fuji Xerox, silica coated papers, transparency materials, fabrics, plastics, polymeric films, and the like.

The inks of the present invention in embodiments are usually slightly yellow to brown in color, and can enable printed documents wherein the dye thereof comprised of a porphyrin chromophore can function as a taggant, which is detectable under special viewing conditions, and these inks can also be selected for processes wherein it is desired to place invisible markings on documents; examples of such situations include providing security markings to control the number of copies made of a document, providing invisible markings that can be detected by an imaging device and that provide instructions to the imaging device (such as instructions not to copy certain portions of the document or to alter the color of certain portions of the document), identifying the machine with which the original document was made, or the like. Examples of apparatuses, or machines and certain inks thereof that may be selected are disclosed in U.S. Pat. No. 5,225,900, the disclosure of which is totally incorporated herein by reference. Further, inks that are colorless in the visible wavelength range and contain two or more different dyes that are detectable in other wavelength regions are useful in processes using one or several different sensors.

Embodiments of the present invention include an ink composition comprised of a solution comprised of a dye comprised of a porphyrin chromophore, and authenication processes thereof, such as a process for printing concealed images, detectable by fluorescence which comprises illuminating the image with a light source emitting between 300 nanometers and 450 nanometers, and detecting the light emitted by the image with a sensor sensitive in the 500 to 800 nanometers spectral range.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

Ink Preparation

There was prepared an ink composition as follows: A stock solution was prepared by combining at room temperature five (5) grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, $M_w$ 18,500, obtained from Polysciences, 128 milligrams of DOWICIL200 ™, obtained from Dow Corporation and 195.52 grams of deionized water. This solution was stirred with a magnetic stirrer for 3 hours. To 33.0 grams of the aforementioned solution were added 1.13 milliliters of water and 0.87 milliliter of a solution of 5,10,15,20-tetrakis-(1-methyl-4-pyridyl)-21H,23H-porphine, tetra-p-tosylate salt, a porphyrin dye, 6.1 milligrams, obtained from Aldrich Chemical Corporation, dissolved in 10 milliliters of water. The mixture was filtered through a 0.45 micron filter. There resulted a tan-colored ink comprised of 0.005 percent by weight of the porphyrin dye, 84 percent by weight of water, 8.4 percent by weight of butyl carbitol, 5.6 percent by weight of glycerol, 2 percent by weight of cyclohexylpyrrolidinone, 0.032 percent by weight of polyethylene oxide, and 0.05 percent by weight of DOWICIL TM. The ink thus prepared was incorporated in a DESK JET TM Hewlett Packard ink jet printer. Prints were formed on a Xerox 4024 TM paper obtained from Xerox Corporation and on a Sanyo Kokusaku FX-L paper obtained from Fuji Xerox Corporation of Japan. In each instance, no patterns could be detected on the prints under normal viewing conditions. The optical density of a printed solid area measured with a Macbeth TR927 Densitometer was 0.02. Illumination at a wavelength of 418 nanometers of the prints placed in the sample compartment of a Fluorolog 212 fluorescence spectrometer, available from SPEX Industries, resulted in a strong fluoresence emission characterized by two bands with maxima at 648 nanometers and 714 nanometers. Excellent contrast was achieved on both papers, the ratio of the fluorescence intensity at 648 nanometers of a printed area to the flurescence intensity at 648 nanometers of the blank paper was 10 with Xerox 4024 TM paper and 11.7 with the Sanyo Kokusaku FX-L paper.

EXAMPLE II

Ink Preparation

There was prepared an ink as follows: A stock solution was prepared by combining at room temperature, about 25° C., 5.00 grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, Mw 18,500, obtained from Polysciences, 128 milligrams of DOWICIL 200 TM, obtained from Dow Corporation, and 195.52 grams of deionized water. This solution was stirred with a magnetic stirrer for 3 hours. To 33.0 grams of the aforementioned solution were then added 1.30 milliliters of water and 0.70 milliliter of a solution of 5,10,15,20-tetrakis-(4-trimethylaminophenyl)-21H,23H-porphine, tetra-p-tosylate salt, a porphyrin dye, 5.7 milligrams, obtained from Aldrich Chemical Corporation, dissolved in 10 milliliters of water. The mixture was filtered through a 0.45 micron filter. There resulted a tan-colored ink comprised of 0.005 percent by weight of the porphyrin dye, 84 percent by weight of water, 8.4 percent by weight of butyl carbitol, 5.6 percent by weight of glycerol, 2 percent by weight of cyclohexylpyrrolidinone, 0.032 percent by weight of polyethylene oxide, and 0.05 percent by weight of DOWICIL TM. The ink thus prepared was incorporated in a DESK JET TM Hewlett Packard ink jet printer. Prints were formed on a Xerox 4024 paper obtained from Xerox Corporation and on a Sanyo Kokusaku FX-L paper obtained from Fuji Xerox Corporation of Japan. In each instance, no patterns could be detected on the prints under normal viewing conditions. The optical density of a printed solid area measured with a Macbeth TR927 Densitometer was 0.03. Illumination at a wavelength of 418 nanometers of the prints placed in the sample compartment of a Fluorolog 212 fluorescence spectrometer from SPEX Industries resulted in a strong fluorescence emission characterized by two bands with maxima at 650 nanometers and 715 nanometers. Excellent contrast was achieved on both papers; the ratio of the fluorescence intensity at 650 nanometers of a printed area to the fluorescence intensity at 650 nanometers of the blank paper was 9.0 with Xerox 4024 TM paper and 11.3 with Sanyo Kokusaku FX-L paper.

EXAMPLE III

Preparation of a Porphyrin Dye

The porphyrin dye 5,10,15,20-tetrakis-(2-hydroxyethyl-4-pyridyl)-21H,23H-porphine chloride salt was prepared as follows: 2.0 grams of 5,10,15,20-tetrakis-(pyridyl)-21H,23H-porphine, obtained from Aldrich Chemical Company, were added to 100 milliliters of 2-chloroethanol placed in a 200 milliliter round-bottom flask equipped with a reflux condenser and a magnetic stirrer. The mixture was heated at reflux for 5 hours. The solvent was removed by vacuum distillation of the cooled reaction mixture. The dry residue was washed with 500 milliliters of diethyl ether. It was isolated by filtration and recrystallized from 750 milliliters of a mixture of 10 percent by weight of water and 90 percent by weight of propanol. The purified product (2.47 grams, 83 percent yield) was a purple-brown solid. The visible absorption spectrum of this material in water presented a strong band centered at 420 nanometers, and two weak bands centered at 516 nanometers and 584 nanometers.

EXAMPLE IV

Ink Preparation

There was prepared an ink as follows: A stock solution was prepared by combining at room temperature, about 25° C., 5.00 grams of cyclohexylpyrrolidinone, obtained from Aldrich Chemical Corporation, 21.0 grams of butyl carbitol, obtained from Aldrich Chemical Corporation, 14.0 grams of glycerol, obtained from Aldrich Chemical Corporation, 0.08 gram of polyethylene oxide, $M_w$ 18,500, obtained from Polysciences, 128 milligrams of DOWICIL 200 TM, obtained from Dow Corporation, and 195.52 grams of deionized water. This solution was stirred with a magnetic stirrer for 3 hours. To 9.0 grams of the aforementioned solution were added 0.11 milliliter of a solution of 5,10,15,20-tetrakis-(2-hydroxyethyl-4-pyridyl)-21H,23H-porphine, tetrachloride salt, 4.46 milligrams, prepared as described in Example III, dissolved in 2 milliliters of water. The pH of the resulting mixture was adjusted to 8.41 by addition of 1 drop of a molar solution of sodium hydroxide in water. The mixture was filtered through a 0.45 micron filter. There resulted a tan colored ink comprised of 0.005 percent by weight of the porphyrin dye, 84 percent by weight of water, 8.4 percent by weight of butyl carbitol, 5.6 percent by weight of glycerol, 2 percent by weight of cyclohexylpyrrolidinone, 0.032 percent by weight of polyethylene oxide, and 0.05 percent by weight of DOWCIL TM. The ink thus prepared was incorporated in a DESK JET TM Hewlett Packard ink jet printer. Prints were formed on a Xerox 4024 TM paper obtained from Xerox Corporation and on a Sanyo Kokusaku FX-L paper obtained from Fuji Xerox Corporation of Japan. In each instance, no patterns could be detected on the prints under normal viewing conditions. The optical density of a printed solid area measured with a Macbeth TR927 Densitometer was 0.03. Illumination at a wavelength of 418 nanometers of the prints placed in the sample compartment of a Fluorolog 212 fluorescence spectrometer from SPEX Industries resulted in a strong fluoresence emission characterized by two bands with maxima at 654 nanometers and 717 nanometers. Excellent contrast was achieved on both papers; the ratio of the fluorescence intensity at 654 nanometers of a printed area to the fluorescence intensity at 654 nanometers of the blank paper was 10.2 with Xerox 4024 paper and 12 with Sanyo Kokusaku FX-L paper.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition consisting of a solution comprised of a dye comprised of a porphyrin chromophore, and which solution contains water, a humectant and a biocide; and wherein said dye is 5,10,15,20-tetrakis-(1-methyl-4-pyridyl)-21H,23H-porphine tetra-acetate salt present in an amount of from about 0.0005 to about 0.01 percent by weight, said humectant is selected from the group consisting of ethylene glycol, propylene glycol, and diethylene glycol present in an amount of from about 3 to about 50 percent by weight, said biocide is present in an amount of from about 0.0001 to about 4.0 percent by weight, and said water is present in an amount of from about 49.5 to about 96.5 percent by weight; and which ink composition is utilized in ink jet printing processes.

* * * * *